United States Patent [19]

Klaes

[11] Patent Number: 4,764,311

[45] Date of Patent: Aug. 16, 1988

[54] APPARATUS FOR MIXING GASEOUS MIXTURES INTO THE WATER OF A PROTEIN SKIMMER

[76] Inventor: Benedikt J. Klaes, Bonner Str. 63, 5483 Gimmingen, Fed. Rep. of Germany

[21] Appl. No.: 885,716

[22] Filed: Jul. 15, 1986

[30] Foreign Application Priority Data

Jul. 19, 1985 [DE] Fed. Rep. of Germany ....... 3525861

[51] Int. Cl.$^4$ .............................................. B01F 3/04
[52] U.S. Cl. ........................................ 261/28; 261/87; 210/221.2; 417/66
[58] Field of Search ............ 210/169, 219, 220, 221.1, 210/221.2; 261/24–34.1, 83, 84, 87, 93; 417/66–72, 424

[56] References Cited

U.S. PATENT DOCUMENTS

| | | | |
|---|---|---|---|
| 3,053,390 | 9/1962 | Wood | 261/84 X |
| 3,320,160 | 5/1967 | Welles, Jr. et al. | 210/221.1 X |
| 3,820,759 | 6/1974 | Hege | 261/87 X |
| 3,837,627 | 9/1974 | Sence et al. | 261/29 |
| 3,976,453 | 8/1976 | Brown | 261/28 X |
| 4,033,704 | 7/1977 | Wadge et al. | 210/220 X |
| 4,139,579 | 2/1979 | Blum | 261/29 |
| 4,154,681 | 5/1979 | Shields et al. | 210/169 |
| 4,312,752 | 1/1982 | Malik | 210/169 |
| 4,468,358 | 8/1984 | Haegeman | 210/219 X |
| 4,490,250 | 12/1984 | Dockery | 210/169 |
| 4,505,813 | 3/1985 | Graves | 261/87 X |
| 4,512,724 | 4/1985 | Horvath | 210/169 X |
| 4,551,285 | 11/1985 | Jackson | 261/87 |
| 4,710,325 | 12/1987 | Cramer et al. | 261/24 |

OTHER PUBLICATIONS

Erwin Sander Co. Brochure, entitled "Gross-Abschaumer" (2 pages).
Text by L. Muller, entitled "Der Eiweiss-Abschaumer", pp. 89–93.

Primary Examiner—Tom Wyse
Attorney, Agent, or Firm—Pollock, Vande Sande & Priddy

[57] ABSTRACT

The present invention provides a process and apparatus for mixing gaseous mixtures into sea-water pumped from an aquarium through the contact tube of a protein skimmer. The invention forms air bubbles of a specific uniform diameter so as to obtain an optimum skimming. The apparatus has a centrifugal pump closed about the periphery of the vanes at the suction side. A suction port at the axial part of the impeller forms water intake ports which surround an internal gas injection connection projecting into an axial water suction connection of a central disk fixed within the suction port of the impeller. The height of the water column over the suction point can, within limits, be taken into account by different gas and water suction cross-sections, adjustment of the gas injection connection relative to the water suction connection, and different sizes of the impeller.

17 Claims, 1 Drawing Sheet

APPARATUS FOR MIXING GASEOUS MIXTURES INTO THE WATER OF A PROTEIN SKIMMER

TECHNICAL FIELD

The invention relates to a process and apparatus for introducing gaseous mixtures into the sea-water located in the contact tube of a protein skimmer. According to the present invention, the water to be skimmed is itself used for sucking in the gaseous mixture by means of a centrifugal pump and an internal injector projecting into a suction port of this pump, thus to produce gas-bubbles with a diameter of 0.1 to 0.5 mm, to whirl the bubbles in the water and to mix them with the same. The function of the protein skimmer is to remove undesired substances, such as suspended particles, colloids, dissolved protein, protein fragments such as amino acids and aromatic amines as completely as possible from the aquarium water. This takes place according to the flotation principle, in that gas bubbles are attached to the particles and increase the buoyancy of the latter to such an extent that they rise to the top of the contact tube in the direction counter to the water flow direction and are there removed from the circuit by an overflow (flow direction in the contact tube is from top to bottom).

BACKGROUND ART

In known methods and apparatus for mixing gaseous mixtures into the sea water of a protein skimmer there are problems due to the fact that the efficiency of flotation is highly dependent on the size of the gas bubbles used. Thus too small bubbles have an inadequate buoyancy and are entrained downwards by the water flow, whilst too large bubbles rise excessively rapidly and therefore either do not attach to the particles to be removed, or come loose from them again due to their excessively high rate of rise.

As the protein particles and the attached bubbles rise counter to the water flow direction to become removed from the circuit by the overflow of the contact tube, the protein skimmer operates most effectively when used in counter current manner, i.e., the water flows from top to bottom and the gas bubbles from bottom to top, i.e., oppositely to one another. The gaseous mixture required for skimming must be introduced as near to the bottom as possible over the contact tube outlet. In order to permit this, a vacuum or underpressure must be produced, which is higher than the hydrostatic pressure at the point at which suction of the gaseous mixture is to take place.

Hitherto, the air or air-gas mixture has been introduced into the contact tube of a protein skimmer by means of effusers made from lime or linden wood or other fine-pored materials through which compressed air is forced, or according to a second process by means of a centrifugal pump having an open, exclusively water-sucking impeller. In the second method, the gaseous mixture to be admixed with the water sucked by the centrifugal pump is sucked through the water flow from an annular duct, which is spaced from the impeller of the centrifugal pump and surrounds the impeller's periphery.

The first-mentioned process suffers from a poor reproducibility of the air or gas quantity, because in the case of the effusers the pores are either encrusted by salt or so widened by ozone that it is necessary to constantly check and readjust the air pressure and therefore air quantity and bubble size. Furthermore, for the purpose of the ozonization of the aquarium water, the air must be dried because otherwise condensation water is precipitated in the ozonizer and consequently the latter is no longer able to function.

In the case of the pump-operated protein skimmers, although air drying is made superfluous, the energy requirement is 550 to 1100 Watts and the amount of noise produced precludes operation in the home. The size, i.e., an external diameter of 0.5 to 1.0 m and a height of 2.53 to 3.4 m makes it possible to install such a protein skimmer in the home. The pump driving motors require a high power consumption. Due to the complicated operation and the resulting difficult and complicated manufacture, such a skimmer is also much to expensive for most aquarium operators.

DISCLOSURE OF THE INVENTION

The main aim of the present invention is to provide a novel method for skimming contaminations out of liquids, especially for skimming protein particles, similar colloidal constituents and other suspended substances out of the water of sea water aquaria, which is simplified to that known method using a centrifugal pump which is open at its suction side and thus needs an apparatus for admixing air or an air-gas mixture. The method is characterized by smaller dimensions, simpler design, manufacture and maintenance and lower energy requirements as compared with the hitherto known centrifugal pump-operated skimmers. The method also provides a precisely defined, uniform air quantity and mixing with air bubbles of a specific uniform diameter so as to obtain an optimum skimming with a constant water level in the contact tube and an appropriate diameter of the gas bubbles.

This aim is achieved, following the invented method, by sucking and mixing gaseous mixtures into the liquid of a protein skimmer, which flows after coarse mechanical prefiltering through the contact tube of the protein skimmer from its top to its bottom and in a circuit to a reservoir (aquarium) and back to the contact tube.

The gaseous mixtures are sucked into the liquids pumped through the contact tube through an air pipe extending from the outside of the contact tube to an internal injector at an injection point at a distance of at least approximately 30 cm above the water outlet of the contact tube. The internal injector projecting into an axial suction port of a centrifugal pump which is closed at the rest of its suction side, and uses the liquid to be skimmed and to be simultaneously sucked by the centrifugal pump sucking the gaseous mixture. The gaseous mixture is introduced to the contact tube at a suction point in a liquid depth or under a hydrostatic water pressure of approximately 1–1.5 m water column, and as a liquid-gas mixture of approximately 10:1 (volume percentage) produced in the impeller of the centrifugal pump. The whirling of the liquid-gas mixture produces gas bubbles having a diameter of 0.1 to 0.5 mm, and this water-gas mixture mixes with the liquid located in the contact tube, thus to improve the amount of the gas mixture dissolved in the liquid and/or to improve the skimming of the protein particles and the like.

An apparatus for performing the invented method comprises a centrifugal pump, a circuit for pumping the contiminated mechanically prefiltered liquids through the contact tube of a protein skimmer from the top to the bottom, a liquid outlet at the bottom of the contact tube, means for introducing gaseous mixtures to the liquid in the contact tube and means for sucking the contaminated liquid to be skimmed and for mixing this liquid with the introduced gas for attachment of the gas bubbles to the particles of the contaminations and to dissolve the gas in the liquid. The centrifugal pump is attached laterally to the wall of the contact tube by arranging the pump drive motor outside the tube and the hydraulic part of the pump inside. The pump casing or pump flange is arranged and mounted in such a way that the hydraulic part is introduced inside of the contact tube at a distance of at least 30 cm above the liquid outlet of the contact tube. The outlet of the casing on the pressure side of the centrifugal pump has an opening directing the pump discharge in a direction above the top of the centrifugal pump. The impeller of the centrifugal pump has an axial suction port and is closed to the outer periphery of the suction port. In the middle of the suction port and of the impeller is arranged an internal injector to supply the air-gas mixture through a free coaxial mounting of an injection connection inside a suction opening of the suction connection.

The injection connection is connected to the air pipe in the flange of the centrifugal pump or in the wall of the contact tube, by which there is supplied the air-gas mixture to the suction point of the contact tube. An advantageous pump casing outlet directed tangentially to the contact tube circumference is provided and formed by a pressure duct or channel which opens towards the inside of the contact tube at the top and to the front of the impeller. Through a reduction of the counter pressure at the pump casing outlet there is brought about an increase in the water flow and consequently a rise in the vacuum at the suction connection of the impeller.

Advantageously, the suction port of the impeller contains a disk, whose edge rests on the salient rim of the suction port of the impeller and seals the same, so that apart from the openings in the disk, said suction port is sealed and consequently the vacuum required for the operation of the injector is produced in the vicinity of the latter.

Through an appropriate alignment and regulation of the effective flow-through cross-sections of the outlets on the pressure side and the suction ports on the suction side of the centrifugal pump it is possible to regulate the amount of liquid or aquarium water and of air-gas mixture sucked so as to produce a water-gas mixture of approximately 10:1 (volume percentage) in the impeller.

The apparatus for performing the method according to the invention makes it possible to use a small dimension centrifugal pump and contact tube for a protein skimmer (preferred length of the contact tube above the suction point: 95-150 cm, external diameter: 20 cm) which is of simple design and manufacture, and to produce very small air bubbles and a constant air quantity. The parts relevant for producing the bubbles are constantly well rinsed with water, so that they are not oversalted when skimming protein out of sea water and consequently no readjustment is required. The motor has water lubricated friction bearings and is noiseless. In addition, it requires no shaft packing, such as a shaft sealing ring or face seal, which aids the energy balance. Compared with the hitherto known process, a considerable energy saving is achieved because there is no air drying for ozonization purposes and the motor has a power consumption of about 60 or 80 Watt (adjustable). The space requirement is also much less than in the hitherto known protein skimmers, because the contact tube requires an external diameter of about 20 cm and a length of less than about 150 cm. In contrast to the hitherto known centrifugal pump-operated skimmers, the apparatus needs no maintenance.

BRIEF DESCRIPTION OF THE DRAWINGS

The invention is described in greater detail hereinafter relative to a preferred embodiment of the apparatus for performing the inventive process and with reference to the attached drawings, which show.

DETAILED DESCRIPTION OF THE INVENTION

Figure 1:
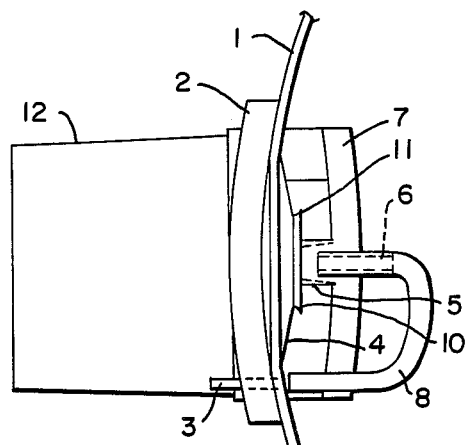
FIG. 1 A plan view of the apparatus which the hydraulic part of the centrifugal pump located in the skimmer contact tube and the external pump motor.
Figure 3:
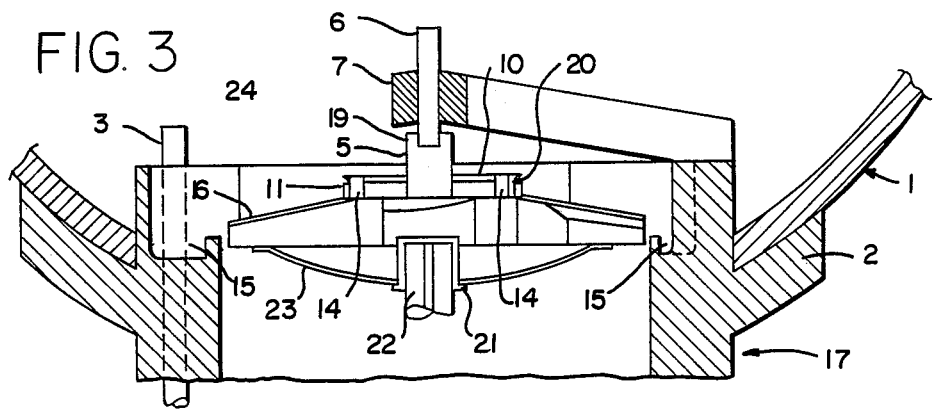
FIG. 3 A partial section view along line A-B through the hydraulic part shown in FIG. 2, whilst representing the arrangement of the flange with the hydraulic part of the pump positioned in a contact tube wall opening.

According to FIGS. 1 and 3, a centrifugal pump 17 with an external drive motor 12 (60 or 80 Watt, 50 Hz a.c.) and an internal hydraulic part projecting into the contact tube 1 is fitted to the latter by means of a flange 2, which is sealed against the contact tube. An air-gas mixture is supplied to the pump by an air pipe 3 guided from the outside to the inside in flange 2.

Figure 2:
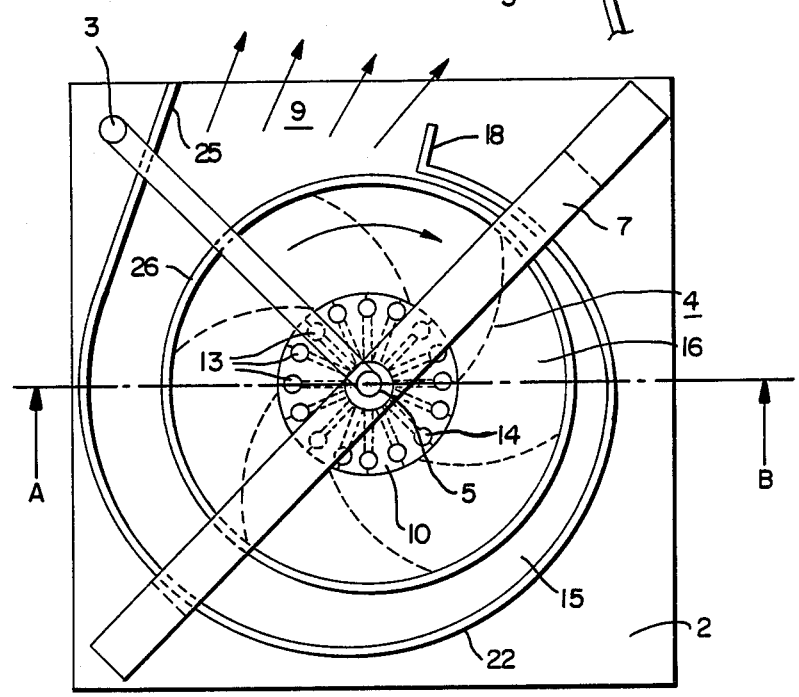
FIG. 2 A view of the hydraulic part as seen from the inside of the contact tube.

According to FIG. 2, the inside portion of flange 2 forms a pressure duct or channel 15, which with a spirally widening outer wall 27 surrounds an impeller 4 and is open towards the inside of the contact tube 1 at the top and front. The point at which the surrounding outer wall of the pressure duct 15 is closest to the circumference of the impeller 4 represents the start of the pressure duct 15 widening in the free cross-section. The pressure duct terminates in opening 9 on the top of the flange.

An injection connection 6 of the internal injector projects roughly 2.5 mm into an axial suction connection 5 of the impeller, which is closed by part 16 in accordance with FIG. 2 and FIG. 3. The injection connection 6 is fixed by means of a web 7 to flange 2 and centred in suction connection 5.

Web 7 exends in a spaced manner transversely over the center of impeller 4 and at the upper edge of the flange may form a guide surface with the rim of the opening 9 of the spiral pressure duct 15 or widen a flange guide surface 18 provided there.

According to FIG. 1, the air pipe 3 is connected to the injection connection 6 by a hose 8 or a tube, enabling the air-gas mixture to be supplied to the injection connection 6. According to FIG. 3, the injection connection 6 and suction connection 5 have their diameters precisely matched to one another. The internal diameter of the suction connection is conically widen by 1 mm towards the front and at its opening 19 has an internal diameter of 7.5 mm, whereas the injection connection is cylindrical and has an external diameter of 5 mm. The connections are coaxially arranged with respect to one another in such a way that the water flowing in between the injection and suction connections sucks the air in the injection connection 6 into the impeller 4.

A disk 10 is fixed in impeller 4 in such a way that it rests with its edge 20 on the impeller suction port 24 and is shaped to form a connection piece which closes the same (FIG. 3).

According to FIGS. 2 and 3, on the periphery of disk 10 are equidistantly spaced sixteen bores 14 with a diameter of 3.5 mm diameter on a concentric circle with a diameter of 25 mm and which are reciprocally displaced by in each case 22.5°. These bores 14 are connected to the suction connection 5 firmly applied to the center of disk 10 by means of in each case one 1.2 mm wide and 4 mm deep radial ducts 13 on the side of said disk facing the inside of impeller 4.

The diameter of the sixteen bores 14 on the peripheral hole circle is a function of the hydrostatic pressure to be overcome in order to suck in the air-gas mixture.

The pump comprises a slotted tube motor with a power consumption of 60 or 80 Watt, 50 Hz a.c. There is chosen the smaller or higher power of 60 or 80 Watt according to the amount of air needed to be sucked by the internal injector. This amount depends upon the hydrostatic pressure and height at which the centrifugal pump is mounted laterally of the contact tube. The number of revolutions is thus increased with the power applied, e.g. from 1700 or 2200 rounds per minute to 2000–2500 rounds per minute.

The shaft and bearings are made from oxide ceramic, whilst the slotted tube and impeller are made from chrome nickel steel. The impeller has an external diameter of 70 mm and the diameter of the suction port 24 is 30 mm. The vertical clearance of the impeller in the suction port is 6.2 mm at the beginning of the passages formed between the vanes and is 3 mm at the periphery. Disk 10 is 15 mm thick and the suction connection 5 firmly applied to the center thereof is 9 mm long, measured from opening 19 to the start of the radial passages 13.

The impeller is connected by means of a collet on the back to the end of the drive shaft and is rotated in operation by motor 12. As a result of the water accelerated by the impeller vanes towards their outer edge and in the back of impeller disk 10 and in its radial ducts 13 to the outside, a vacuum is produced in the passages and ducts and in the impeller, which sucks water through the central suction connection 5 and the bores 14 of the peripheral hole circle. According to the injector principle, the through-flowing water also produces a vacuum in the fixed injection connection 6, which leads to the suction of air or an air-gas mixture via connecting line 8 and air pipe 3.

The gas-water mixture which has entered through the suction connection of the internal injector is now conveyed to the periphery of the disk by the centrifugal force in the rotating impeller. It is mixed there with the water entering through the bores of the peripheral hole circle to prevent a breaking away of the flow and consequently a collapse of the vacuum. After leaving the impeller, the water-gas mixture in the spiral pressure duct 15 is led upwards to the outlet 9 in flange 2 and is returned through the same to the contact tube 1. The water present in the contact tube is rotated by the sloping, upwardly directed arrangement of the outlet 9 and its guide surface 18, 25 tangential to the contact tube. This brings about a partial separation of water and gas bubbles, so that the lighter gas bubbles are mainly displaced towards the centre of the tube, which causes a reduced resuction of the gas bubbles through the injector and consequently to a rise in the air or gaseous mixture suction through raising of water with a limited admixed gas bubble proportion. The air or gas mixture whose volume has been increased by the vacuum and the resulting expansion is whirled in this state and mixed with the water to be skimmed so that bubbles are formed, whose uniform size of 0.1 to 0.5 mm is ideal for the skimming process.

BEST MODE OF CARRYING OUT THE INVENTION

The best mode of carrying out the invention is principally explained in the description of the drawings (FIG. 1–FIG. 3).

According to the process of the present invention, an appropriate gaseous mixture of the above-mentioned very small air bubbles and of a constant air quantity are mixed with sea water in a contact tube of a protein skimmer to cause flotation and skimming of colloidal constituents in the water flowing out of the aquarium to the contact tube. By using a new apparatus including a centrifugal pump and an internal injector axial protruding in a suction port of a closed impeller, which is mounted laterally inside and outside to the contact tube at a height of approximate 30 cm above the tube-bottom and the water-outlet of the contact tube, there is sucked water under a hydrostatic water pressure of approximately 1 m water column from the contact tube. There is also sucked an air-gas mixture through an air pipe 3 from the outside to the suction port 24 of the centrifugal pump 17. Thus, the water-gas mixture of approximately 10:1 (volume percentage) is mixed in the impeller so that gas bubbles with a diameter of 0.1 to 0.5 mm are mixed with the aquarium water located in the contact tube 1 and are attached thereto or dissolved in the water. The water is pumped in a countercurrent manner to the rising air bubbles along the contact tube to cause a stronger flotation.

In this apparatus there is needed no air drying for ozonization purposes. As the external drive motor of the pump there is used a slotted tube motor 12 which merely has a power consumption of 60 and 80 Watts (adjustable). In the U.S.A. there is used a current of 60 Hz, 110 V, instead of 50 Hz, 220 V. Because of the higher motor frequency, there is a higher revolution number of the impeller 4 of the centrifugal pump 17. To counterbalance the higher suction, equivalent to the motor consumption of 60 Watts (2.200 rounds per minute) or of 80 Watts (2.500 rounds per minute), there is preferably used an apparatus whose impeller and internal injector are sized differently from the above described apparatus for using 50 Hz, 220 V. a.c.

Thus it is impossible to suck water from the contact tube and to suck a gaseous mixture from the outside of the tube so as to mix water and gas in the ratio of approximately 10:1 and to form gas bubbles with a diameter of 0.1–0.5 mm when using an a.c. current of 60 Hz, 110 V. When applying a thus slightly modified apparatus, the volume of the gas sucked and mixed into the water is about 300 or 400 liters/hour for 60 or 80 Watts.

There is used a smaller external diameter of the impeller, which instead of 70 mm is 62 mm whereas the diameter of the suction port 24 is still 30 mm. The vertical clearance of the impeller at the beginning of the vanes is still 6.2 mm, but is now approximately 4 mm at the periphery. The diameter of the disk 10 and thus of the suction port 24 is still 30 mm, and the disk 10 has also still a thickness of 5 mm.

The different internal injector used consists of a suction connection 9 mm long and having an inner diameter increased from 6.1 mm to 7.7 mm. The injection connection 6 still has an outer diameter of 5 mm and an inner diameter of 4 mm. The connection projects still roughly 2.5 mm into the axial suction connection 5.

The diameter of the bores 14 is increased from 3.5 mm to 4 mm and the size of the radial ducts 13 is 2 mm wide and 4 mm deep. Thus the ratio of the overall size of the water intake ports on the peripheral circumference of the disk as formed by the bores 14,—to the size of the central opening of the disk as formed between the opening 19 of the suction connection 5 and the outside of the axially projecting injection connection 6, is 2.37:1 (46.57 mm$^2$/19.63 mm$^2$)

INDUSTRIAL APPLICABILITIY

It is evident according to the above description that the inventive process for the suction and mixing in of gaseous mixtures in the water pumped through the contact tube of a protein skimmer, and also the apparatus needed for this process, has a far range of industrial applicability.

What is claimed is:

1. An apparatus for introducing a gaseous mixture into a liquid in the contact tube of a protein skimmer, said apparatus comprising:
  a centrifugal pump having a drive motor and an hydraulic part, said hydraulic part including an impeller and an outlet on the pressure side of the impeller, said impeller having a central suction port on its suction side and being substantially closed radially outside of the outer periphery of said suction port;
  means for mounting said pump on the wall of said contact tube with the drive motor outside the tube and the hydraulic part inside the tube, said impeller being mounted for rotation by said drive motor and said rotation of said impeller causing suction for sucking a portion of said liquid into said suction port; and,
  gas injector means for introducing said gaseous mixture into said liquid portion sucked into said suction port, said gas injector means including a gas injection connection having a free end, means for coaxially mounting said free end so as to introduce said gaseous mixture inside said suction port, and means for supplying said gaseous mixture to said gas injection connection through the wall of said contact tube, rotation of said impeller causing said gaseous mixture to be mixed with said sucked liquid portion to form gas bubbles in a gas and liquid mixture and said gas and liquid mixture to be discharged from said outlet into said contact tube.

2. An apparatus according to claim 1, wherein a disk is fitted into the impeller suction port for rotation with the impeller and is provided centrally with a suction connection surrounding the free end of the coaxially mounted gas injection connection of said injector means, and wherein near the periphery of said disk are arranged a plurality of bores providing water intake ports spaced one to another near said periphery and having small inlet openings compared to the inlet opening of said suction connection which is arranged coaxially to the impeller of the centrifugal pump.

3. An apparatus according to claim 2, wherein said disk is substantially circular and said bores near the periphery of said disk are arranged substantially equidistantly spaced along an imaginary concentric circle near the circle like periphery of said disk.

4. An apparatus according to claim 3, wherein a plurality of ducts are imbedded on the inside of said disk, and each of said ducts is aligned between the central opening of the disk and a corresponding one of said bores near the periphery of the disk so that the gas centrally injected through said injector means is guided to the side of said water intake ports near the peripheral circumference of the disk and is whirled there with the water to provide said bubbles.

5. An apparatus according to claim 4, wherein the injection connection of said injector means is positioned along an axial extension of the centrifugal pump impeller axis and centrally of the opening of the impeller's suction port.

6. An apparatus according to claim 5, wherein said free end of the injection connection of said injector means has an outer cylindrical shape and is located by said coaxial mounting means in the inlet opening of said disk suction connection, said disk suction connection having a conically narrowing diameter from the outside to the inside.

7. An apparatus according to claim 6, wherein the injection connection is adjustably fixed in the suction port of said impeller of the centrifugal pump by said coaxial mounting means which is connected to a fixed pump casing member.

8. An apparatus according to claim 7, wherein the injection connection is longitudinally adjustable in the direction of the impeller.

9. An apparatus according to claim 2, wherein the ratio of the overall size of the bores forming water intake ports near the peripheral circumference of the disk to the size of the central opening of the disk as formed between the inside of the central opening of the water suction connection and the outside of the axial projecting gas injection connection is substantially larger than 1.

10. An apparatus according to claim 1, wherein the hydraulic part of the centrifugal pump has a flange aligned with and formed to the inside wall of the contact tube, and said outlet opening passes laterally from the top and front of the impeller into the contact tube and slopes upward tangentially to the circumference of the liquid column in the contact tube.

11. An apparatus according to claim 10, in which said upwardly sloped outlet opening is fed by a pressure duct spirally aligned around the periphery of the impeller, said pressure duct extending upwards to said outlet opening which passes through said flange.

12. An apparatus according to claim 11, wherein the pressure duct is formed by a spirally widening outer wall surrounding the impeller.

13. An apparatus according to claim 12, wherein said upwardly sloped outlet opening has outflow guide surfaces which are laterally directed into the contact tube and slope upwards tangentially to the circumference of the liquid column inside the contact tube so as to achieve a high rotation of the liquid in the contact tube, a great liquid quantity through the pump, and consequently a high vacuum on the suction side of the pump.

14. An apparatus according to claim 1, wherein the injection connection is positioned along an axial extension of the centrifugal pump impeller axis and centrally of the inlet opening of the impeller's suction port, and wherein the suction port of the impeller is partially sealed by a concomitantly rotating part such that, in addition to the closed suction side of the impeller extending radially outside of the suction port, a part of the suction port is closed by said concomitantly rotating part to reduce the size of the residual suction connection of the impeller and increase the vacuum produced by the pump, whereby the maximum vacuum is displaced towards the center of the suction port in the direction of the injection connection.

15. An apparatus according to claim 14, wherein said concomitantly rotating part is in the form of a circular disk sealed and fixed by a press fit with the suction port of said impeller so that the central suction connection is coaxially mounted relative to the gas injection connection, and wherein said disk near its outside periphery and along a peripheral circle has a plurality of spaced apart bores for the entry of the liquid.

16. An apparatus according to claim 15, wherein between the spaced bores near the periphery of the disk ducts are imbedded on the inside of the disk and are aligned and extend between the central opening of the disk suction connection and the individual openings of the bores near the peripheral circumference of the disk.

17. An apparatus according to claim 1, wherein said outlet on the pressure side of said centrifugal pump has an opening for discharging at least a portion of said gas and liquid mixture in a direction above the top of said centrifugal pump, and wherein said discharge opening is at a distance of at least 30 cm above the liquid outlet of said contact tube.

* * * * *